US006208967B1

(12) United States Patent
Pauws et al.

(10) Patent No.: US 6,208,967 B1
(45) Date of Patent: Mar. 27, 2001

(54) METHOD AND APPARATUS FOR AUTOMATIC SPEECH SEGMENTATION INTO PHONEME-LIKE UNITS FOR USE IN SPEECH PROCESSING APPLICATIONS, AND BASED ON SEGMENTATION INTO BROAD PHONETIC CLASSES, SEQUENCE-CONSTRAINED VECTOR QUANTIZATION AND HIDDEN-MARKOV-MODELS

(75) Inventors: Stefan C. Pauws, Eindhoven (NL); Yves G. C. Kamp, Limal (BE); Leonardus F. W. Willems, Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 08/806,873

(22) Filed: Feb. 25, 1997

(30) Foreign Application Priority Data

Feb. 27, 1996 (EP) .................................. 96200509

(51) Int. Cl.[7] ....................................... G10L 9/00
(52) U.S. Cl. ..................... 704/256; 704/255; 704/258; 704/242
(58) Field of Search .................. 704/258, 256, 704/255, 253, 241, 242, 243, 244, 245

(56) References Cited

U.S. PATENT DOCUMENTS 5,579,436 * 11/1996 Chou et al. ..................... 704/244
5,715,367 * 2/1998 Gillick et al. .................... 704/263

OTHER PUBLICATIONS

Speech Communication, pp. 207–220, vol. 19, No. 3, Sep. 1996, S. Pauws et al, "A Hierarchical Method of Automatic Segmentation fort Synthesis Applications".

O. Boeffard et al, Automatic Generation of Optimized Unit Dictionaries for Text to Speech Synthesis, International Conf. on Speech and Language Processing, Banff, Alberta Canada (1992), pp. 1211–1215.

L.R. Rabiner, "A tutorial on Hidden Markov Models and Selected Applications in Speech Recognition", Proc. IEEE, vol. 77, No.2, Feb. 1989, pp. 257–286.

C.S. Myers and L.R. Rabiner, A Level Building Dynamic Time Warping Algorithm for Connected Word Recognition, IEEE Trans. ASSP, vol. 29, No. 2, Apr. 1981, pp. 284–297.

J.G. Wilpon and L.R. Rabiner, A Modified K–Means Clustering Algorithm for Use in Isolated Word Recognition, IEEE Trans. ASSP, vol. 33, No. 3, Jun. 1985, pp. 587–594.

P.A. Taylor and S.D. Isard, Automatic Diphone Segmentation, Eurospeech 91, pp.709–711.

* cited by examiner

*Primary Examiner*—David R. Hudspeth
*Assistant Examiner*—Susan Wieland

(57) ABSTRACT

For machine segmenting of speech, first utterances from a database of known spoken words are classified and segmented into three broad phonetic classes (BPC) voiced, unvoiced, and silence. Next, using preliminary segmentation positions as anchor points, sequence-constrained vector quantization is used for further segmentation into phoneme-like units. Finally, exact tuning to the segmented phonemes is done through Hidden-Markov Modelling and after training a diphone set is composed for further usage.

6 Claims, 3 Drawing Sheets

METHOD AND APPARATUS FOR AUTOMATIC SPEECH SEGMENTATION INTO PHONEME-LIKE UNITS FOR USE IN SPEECH PROCESSING APPLICATIONS, AND BASED ON SEGMENTATION INTO BROAD PHONETIC CLASSES, SEQUENCE-CONSTRAINED VECTOR QUANTIZATION AND HIDDEN-MARKOV-MODELS

A method and apparatus for automatic speech segmentation into phoneme-like units for use in speech processing applications, and based on segmentation into Broad Phonetic Classes, Sequence-Constrained Vector Quantization, and Hidden-Markov-Models.

BACKGROUND TO THE INVENTION

The invention relates to a method for automatically segmenting speech for use in speech processing applications. Of various possible applications, a particular one is speech synthesis, more in particular speech synthesis based on the concatenating of diphones. Diphones are short speech segments that each contain mainly a transition between two adjacent phonemes, plus the last part of the preceding and the first part of the succeeding phoneme, respectively. Diphones may be extracted according to certain rules that are known per se, from a database that has already been segmented into single phonemes. Typically, such a data base consists of isolated words recorded from a particular single speaker in a controlled environment, and also comprises the verified correspondence between phonetic transcription and acoustic realization. A straightforward and automatic realization of the segmentation method according to the preamble and based on phoneme Hidden Markov Models (HMM) has been disclosed in O. Boëffard et al, Automatic Generation of Optimized Unit Dictionaries for Text to Speech Synthesis, International Conference on Speech and Language Processing, Banff, Alberta CANADA (1992), p. 1211–1215. However, the quality of the known method has been found insufficient, in that the boundaries found by the method generally deviate too much from the positions where corresponding boundaries would be placed by a manual procedure. Of course, the segmentation accuracy could be improved if the phoneme HMMs are first trained with a separate and manually segmented database. Setting up of such a manually segmented database is however often too costly, since this has to be repeated each time a new speaker person will be used in a speech synthesis system. In consequence, amongst other things it is an object of the present invention to propose a method for speech segmentation, that is fully automatic, does not need manually segmented speech material, and gives a better result than the reference.

SUMMARY TO THE INVENTION

Now, according to one of its aspects, the invention provides a method for automatically segmenting speech for use in speech processing applications, said method comprising the steps of:

classifying and segmenting utterances from a speech data base into three broad phonetic classes (BPC) voiced, unvoiced, and silence, for attaining preliminary segmentation positions;

using preliminary segmentation positions as anchor points for further segmentation into phoneme-like units by sequence-constrained vector quantization in an SCVQ-step;

initializing phoneme Hidden-Markov-Models with the segments provided by the SCVQ-step, and further tuning of the HMM parameters by Baum-Welch estimation;

finally, using the fully trained HMMS to perform Viterbi alignment of the utterances with respect to their phonetic transcription and in this way obtaining the final segmentation points.

An additional advantage of the method recited is that only minimal initial information is required such as would consist in a phonetic transcription of the utterances. In particular, no separate manually segmented database is needed for estimating the HMM parameters.

Advantageously, after said training a diphone set is constructed for further usage, such as in speech synthesis. The invention has provided a straightforward and inexpensive multi-speaker system.

The invention also relates to an apparatus for segmenting speech for use in speech processing applications, said apparatus comprising:

BPC segmenting means fed by a speech data base for classifying and segmenting utterances received into three broad phonetic classes (BPC) voiced, unvoiced, and silence, SCVQ segmenting means fed by said BPC segmenting means for by using preliminary segmentation positions as anchor points executing further segmentation into phoneme-like units by sequence-constrained vector quantization (SCVQ), phone Hidden-Markov-Means (HMM) fed by said SCVQ segmenting means for initialization of phoneme HMM and further tuning of HMM parameters;

final segmentation means controlled by said HMM.

Such an apparatus would allow untrained personnel to train it in short time to an arbitrary new speaker. Further advantageous aspects of the invention are recited in dependent Claims.

BRIEF DESCRIPTION OF THE DRAWING

These and other objects and advantages of the invention will be discussed more in detail hereinafter with reference to the disclosure of preferred embodiments, and more in particular with reference to the appended Figures that show.

DETAILED DESCRIPTION OF A PREFERRED OVERALL EMBODIMENT

The present invention intends to cut each utterance of a database into a sequence of non-overlapping contiguous phoneme segments and to form a one-to-one correspondence between these segments and a sequence of phonetic class labels provided by the phonetic transcription. Speech can be described appropriately as a sequence of acoustic vectors which each characterize the speech over a uniform time frame of typically 10–20 ms with between-frame shifts of 2.5–10 ms. The p-dimensional acoustic vector of any frame t is $o(t)=[o_1(t) \ldots o_p(t)]'$, the accent indicating vector transposition and a complete sequence of T frames then is represented by $O(1,T)=o(1), \ldots o(T)$. In the embodiment of the present invention, for the BPC segmentation p=5, for the sequence-constrained vector quantization p=12, and for the Hidden-Markov-Modelling, p=51. A broad phonetic class element or phoneme-like unit spanned by a segment I can be represented by a prototypical vector or centroid denoted by $\hat{c}_I$. The intrasegmental distance $d_I(i,j)$ of segment I is defined as the sum of the distances between on the one hand the vectors O(i,j) spanning the segment, and on the other hand the centroid $$\hat{c}_l: d_l(i, j) = \sum_{t=i}^{j} d(o(t), \hat{c}_l).$$

Minimizing the distortion $$\sum_{l=1}^{L} d_l(b_{l-1}+1, b_l) = \sum_{l=1}^{L} \sum_{r=b_{l-1}+1}^{b_l} d(o(t), \hat{c}_l)$$

gives the segmentation points $b_l(l=1 \ldots L-1)$. This general formulation is used hereinafter for the distance measure, the minimization procedure, and also for determining the centroids.

Figure 1:
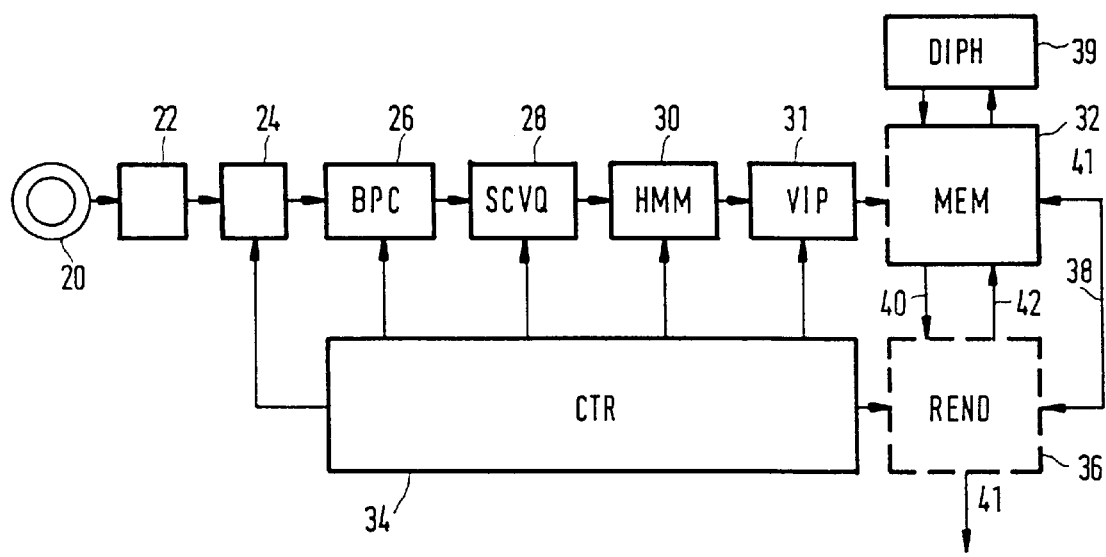
FIG. 1, an overall block diagram of the apparatus.

FIG. 1 shows an overall block diagram of a system embodiment. Herein, item 20 is a microphone for receiving speech from a particular speaker person, who is ordered to utter the set of predetermined isolated words that each have to be segmented. Such sets have been proposed for various languages. Some or all of the words may be nonsense words. The first level of processing in block 22 is periodic sampling, digitizing and filtering. The results are stored in intermediate memory 24 for decoupling reception of the speech from the processing. General control is located in block 34, which may be a standard computer that has been programmed in an appropriate manner, and which controls blocks 24–31, 36. The control may imply synchronizing, providing the application program, and possibly intermediate storage between the various processing steps. For simplification, only a single unidirectional connection has been drawn. Now, after readout of the utterances from memory 24, in block 26 the first stage of classifying and segmenting into broad phonetic classes (BPC) VOIced, UNVoiced, and SILence is undertaken. The results of this preliminary BPC segmentation are further processed in block 28, which executes the second stage of sequence constrained vector quantizing (SCVQ) for further segmenting into phonemes. Block 30 realizes the third stage. It uses the segments delivered by the previous SCVQ stage to initialize the phoneme HMMs which are then further tuned through Baum-Welch estimation on the database to be segmented. For an excellent and well-accessible treatise of HMMs and the so-called Baum-Welch approach, see L. R. Rabiner, 'A tutorial on Hidden Markov Models and Selected Applications in Speech Recognition', Proc. IEEE, Vol. 77, No. 2, February 1989, p. 257–286. Finally, in block 31 these HMMs are used to perform a Viterbi temporal alignment of the utterances of the database against their phonetic transcription. By itself, Viterbi alignment is standard technology, see the same reference.

The result of the segmenting is stored in memory 32. From the sequence of phonemes so produced per uttered word, diphone generating device 39 constitutes the various diphones that are necessary to produce actual speech, which diphones are written back into memory as a database for generating speech that may have an arbitrary content, or for other speech processing applications, on the basis of the actually received limited amount of speech from the human speaker. The control thereto is derived from (notional) control/rendering system 36 that accesses the database via connection 42, receives the diaphones via line 40, and may further execute interaction with memory 32 via bidirectional connection 38. Actual speech output devices via line 41 have not been shown for brevity. A flow chart of the speech processing generally is set up in similar manner, in that each respectively uttered word is fully processed before the next one is taken up.

FIRST STAGE: SEGMENTATION INTO BROAD PHONETIC CLASSES

This first stage segmentation should provide so-called anchor points for subsequent stages. The three classes are silence (SIL), where no speech waveform is present, voiced (VOI), where the speech waveform is quasi-periodic, and unvoiced (UNV), where the waveform is aperiodic or random. In the embodiment, segmenting is based on five distinct measurements, as follows:

normalized short-time energy $E_N$ so that SIL has $E_N$ close to 1 (note that energy is measured in a logarithmic manner);

normalized low-frequency energy $E_{low}$ in the range of 50–1200 Hz;

normalized high-frequency energy $E_{high}$ in the range of 2000–4000 Hz;

zero-crossing rate $Z_N$;

first LPC coefficient a1 of a first-order LPC model.

Figure 2:
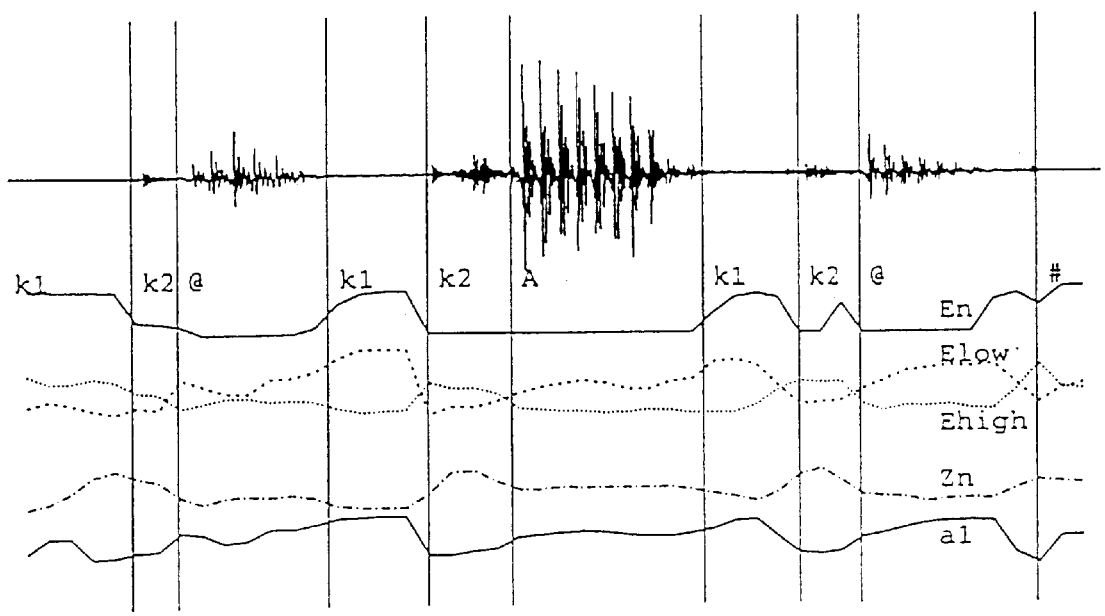
FIG. 2, five measurements for a certain nonsense word.

In the embodiment, the sampled waveform x(k) for k=0 . . . N−1 has been pre-emphasized by a filter function $(1-0.95z^{-1})$, blocked and Hamming-windowed into frames of 20 ms, with a framewise shift of 2.5 ms. FIG. 2 shows the five recited measurements for a nonsense word 'kekakke' in Dutch pronunciation. Immediately below the waveform, the associated phoneme signs have been indicated. As shown, the principal period of vowel 'A' was about 10 msec. Three voiced intervals, three unvoiced intervals, and four silence intervals are clearly discernible in the Figure. The result of the five recited measurements are shown as respective traces. Certain transitions are more clearly visible than others. In practice, transitions between successive phonemes do not always imply a change-of-broad phonetic classes.

Now first, the available phonetic transcription of the utterances is mapped into a transcription in terms of broad phonetic classes; in fact, the system knows what word should actually have been received, as the speaker must enter the words in a prescribed sequence. Assuming that a certain utterance consists in a sequence of L' broad phonetic class elements, one has to find corresponding consecutive segments in the observation $O_1^T$ together with a set of centroids $\{\hat{c}_l\}$ which minimize the total distance defined above. The distance used here is the weighted Euclidean distance and the estimated variance of the measurements is used as weighting factor. This minimization is performed in a dynamic programming framework that is quite similar to the well known level-building approach, cf. C. S. Myers and L. R. Rabiner, A Level Building Dynamic Time Warping Algorithm for Connected Word Recognition, IEEE Trans. ASSP, Vol. 29, No. 2, April 1981, p. 284–297. The method used here is essentially iterative and is continued until no further improvement is achieved. Each iteration of the procedure consists of successive steps. The first step seeks an optimum set of boundaries $b_l$ for a given set of centroids. The second step updates the centroids $\{\hat{c}_l\}$ and the variance using the newly acquired segmentation points. In view of the weighted Euclidean distance used here, the updated centroid representing a broad phonetic class is simply the arithmetic mean of all observation vectors for the given set of segmentation points. The first step starts with unit variance and centroids that represent idealized broad phonetic classes:

$$\hat{c}_{SIL}=(1,0,0,1,1)', \hat{c}_{UNV}=(0,0,1,1,0)', \hat{c}_{VOI}=(0,1,0,0,1)'$$

Minimum, average, and maximum durations of a broad phonetic class element are equal to the sum of the corresponding quantities for the phonemes making up a broad phonetic class segment. Information about the minimum and maximum durations of the phonemes can be found in the literature. This information on minimum and maximum durations is used to limit the search for BPC boundaries by providing upper and lower bounds for the interval in which a BPC segment can lie. Finally, the mean duration serves to scale these minimum and maximum durations in proportion to the actual length of the utterance.

Figure 3:
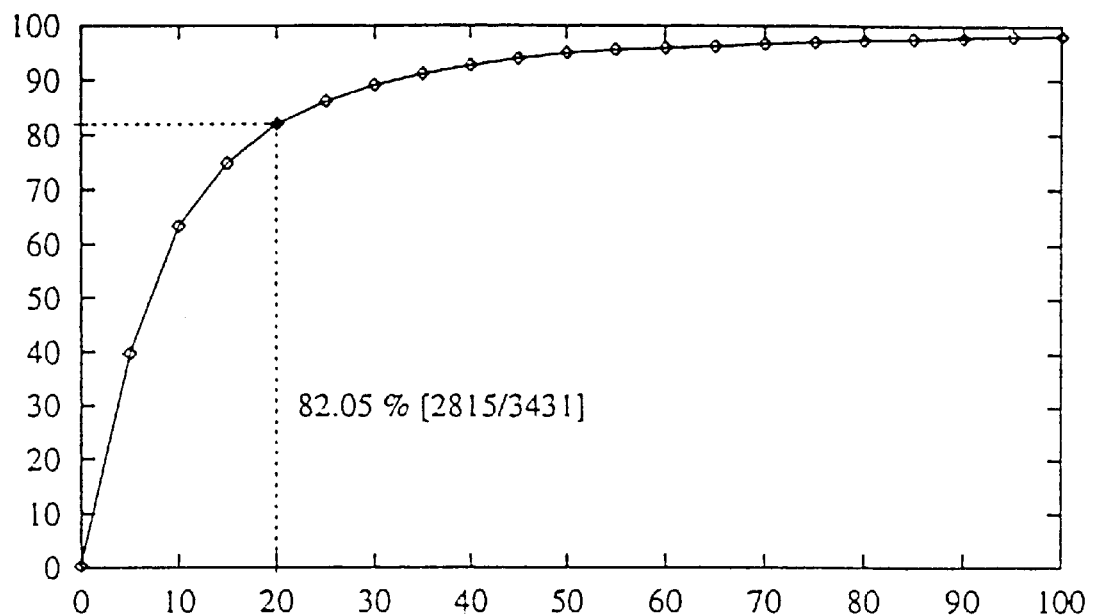
FIG. 3, a first broad phonetic class segmentation.

FIG. 3 shows the result of the first broad phonetic class segmentation, as cumulative fractions that differ less than a particular margin from transition points determined manually. As shown, 82% of the transitions are localized in a satisfactory manner in that the margin is less than 20 msec.

SECOND STAGE: SEQUENCE-CONSTRAINED VECTOR QUANTIZATION (SCVQ)

The above segmentation yields anchor points for further processing of the speech. Generally, this processing would reduce to segmenting each broad phonetic class element into its constituent phoneme-like units. More specifically, the utterances are segmented into consecutive quasi-stationary elements. Because of the requirement for stationarity, diphthongs and plosives are further separated into their constituent phonemes. Again, segment boundaries and centroids must be found that minimize total distortion, which is done in an iterative way resembling the one used in the preceding stage. For the first iteration step, the centroid is defined as the vector that minimizes distortion over all hypotheses carrying the same label and pooled into a single observation sequence $O_{b_{l-1}+1}{}^{b_l} = o_{(b_{l-1}+1)}, \ldots o(b_l)$.

$$\hat{c}_l = \arg_{c_l} \min \frac{1}{b_l - b_{l-1}} \sum_{t=b_{l-1}+1}^{b_l} d(o(t), c_l).$$

Figure 4:
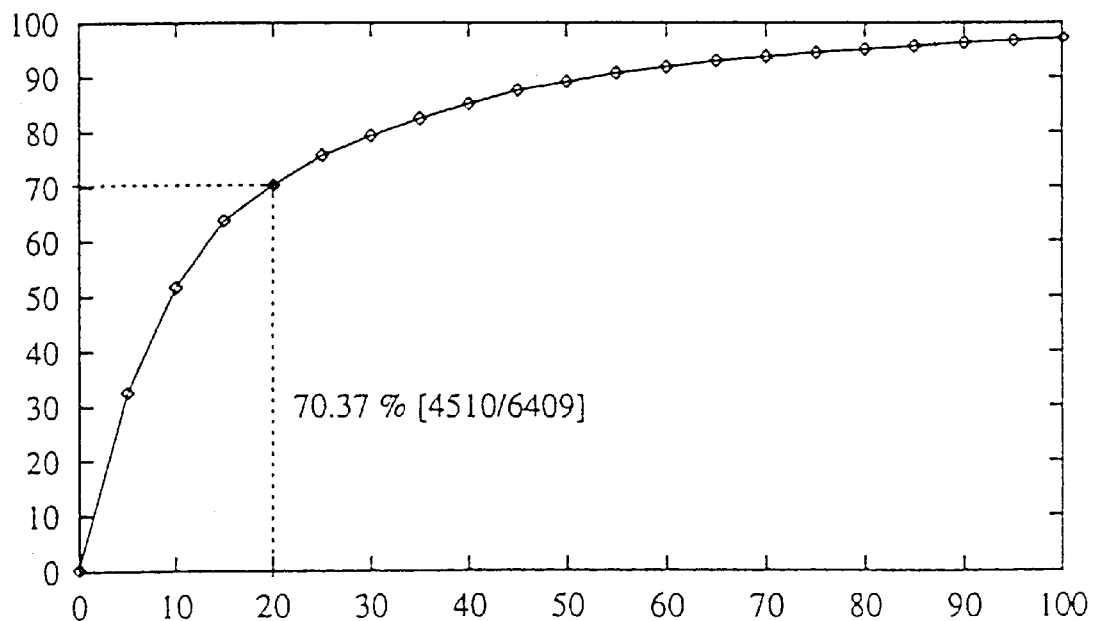
FIG. 4, phoneme segmentation by vector quantization.

In this way, centroids are obtained from the observations at hand, with the obvious advantage, that no a priori knowledge is required. The first SCQV iteration is done by level-building dynamic programming. The scheme of the second iteration is the same as that of the earlier BPC-segmenting stage. The phoneme centroid found in the first iteration is used in the next step as a reference, which reduces the process to template matching. The third and last step calculates a centroid for each label occurrence. Further iterations do not yield anymore improvement. FIG. 4 gives the phoneme segmentation using the anchor points produced by the first stage. In contradistinction to the BPC stage, the labels pertain here to about fifty different phoneme classes. Taking into account the so much greater number of classes, the segmentation is certainly more acceptable than the one of the first stage: for about 70% of all cases, the deviation from manual segmentation was less than 20 msec.

THIRD STAGE: SEGMENTATION BY HIDDEN MARKOV MODELS (HMM)

Through accounting for the statistical variability of speech, the result obtained by SCQV is still further improved by using Hidden Markov Models. In total, again some 50 different phoneme-like units were used, each getting its own HMM. To ensure the realizing of a fully automatic procedure, the HMMs are initialized with the results attained in the SCQV stage. Each phoneme-like unit, except for the burst unit, gets a simple left-to-right HMM topology with six states, and including self-loops and direct transitions to the next stage; therefore, the duration is at least six frames of 5 msec each, and which frames are shorter than considered earlier. A burst-like segment is represented by a 2-stage model with the same sort of self-loops and transitions.

The emission distributions are of the continuous type. Each observation vector is split into 4 subvectors that respectively represent instantaneous features (16-channel filterbank analysis);

the first and second finite differences of these features as determined vis a vis the preceding frames;

energy data.

The emission probability density for each subvector is a multivariate Gaussian mixture distribution.

The HMM parameters are adjusted as follows. Consider a particular phoneme-like unit and the set of observation sequences cut out therefor in the SCVQ stage. The HMM of this phoneme-like unit is initialized by distributing the acoustic vectors of each observation sequence uniformly between the 6 (or 2) HMM states of that unit. As a result, specific acoustic vectors in an observation are assigned to each state of the model by uniform distribution among the states. Next, a k-means algorithm is used to partition these acoustic vectors into clusters from which initial values can be computed for the parameters of the mixture distribution. See also, J. G. Wilpon and L. R. Rabiner, A Modified K-Means Clustering Algorithm for Use in Isolated Word Recognition, IEEE Trans. ASSP, Vol. 33, No. 3, June 1985, p. 587–594.

These parameters are mean vectors, covariance matrices of the component densities, and mixture weights. The transition probabilities are initialized at arbitrary non-zero values. Once these initial HMMs have been obtained, a supervised Viterbi training is applied, which results in a new segmentation. Therefrom, updated HMM parameters can be computed. The latter include transition probabilities, by using the transition statistics between states collected from the alignment path. Next, the models are fine-tuned by estimating parameters according to Baum-Welch for each complete utterance.

Figure 5:
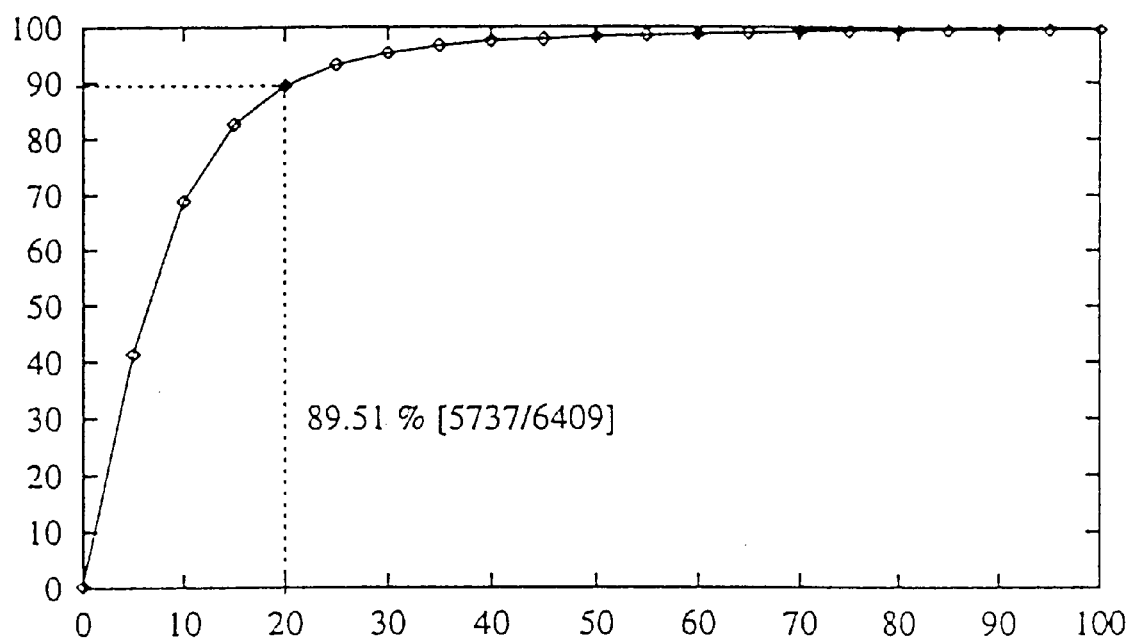
FIG. 5, the same but improved with HMM segmentation.

Finally, the fully trained HMMs are used to perform a Viterbi alignment of each word in the data base against its phonetic transcript. This produces the final segmentation points. FIG. 5 shows the result; the improvement with respect to the SCQV segmentation of FIG. 4 is striking: nearly 90% of the transitions have a deviation of less than 20 msec.

We claim:

1. A method for automatically segmenting speech for use in speech processing applications, said method comprising the steps of:

classifying and segmenting utterances from a speech data base into three broad phonetic classes (BPC) voiced, unvoiced, and silence, for attaining preliminary segmentation positions;

using preliminary segmentation positions as anchor points for further segmentation into phoneme-like units by sequence-constrained vector quantization (SCVQ) in an SCVQ-step;

initializing phoneme Hidden-Markov-Models with the segments provided by the SCVQ-step, and further tuning of the HMM parameters by Baum-Welch estimation;

finally, using the fully trained HMMs to perform Viterbi alignment of the utterances with respect to their phonetic transcription and in this way obtaining the final segmentation points.

2. A method as claimed in claim 1, further including the step of composing a diphone set after obtaining the final segmentation points.

3. A method as claimed in claim 1, wherein said speech processing is speech synthesis.

4. An apparatus for segmenting speech for use in speech processing applications, said apparatus comprising:

BPC segmenting means fed by a speech data base for classifying and segmenting utterances received into three broad phonetic classes (BPC) voiced, unvoiced, and silence, SCVQ segmenting means fed by said BPC segmenting means for by using preliminary segmentation positions as anchor points executing further segmentation into phoneme-like units by sequence-constrained vector quantization (SCVQ), phone Hidden-Markov-Means (HMM) fed by said SCVQ segmenting means for initialization of phoneme HMM and further tuning of HMM parameters;

final segmentation means controlled by said HMM.

5. An apparatus as claimed in claim 4, comprising diphone generating means fed by said segmentation means for composing a diphone set.

6. An apparatus as claimed in claim 4, furthermore comprising an output control stage for controlling a speech synthesis output stage through an intermediate storage stage between a tuning means and said speech synthesis output stage.

* * * * *